N. B. LIVINGSTON.
Cart Scales.

No. 8,391. Patented Sept. 30, 1851.

UNITED STATES PATENT OFFICE.

N. B. LIVINGSTON, OF PORTLAND, INDIANA.

WEIGHING-CART.

Specification of Letters Patent No. 8,391, dated September 30, 1851.

*To all whom it may concern:*

Be it known that I, NORMAN B. LIVINGSTON, of Portland, in the county of Fountain and State of Indiana, have made new and useful Improvements in Weighing-Machines; and I do hereby declare the following to be a full, clear, and exact description of the same, reference being had to the annexed drawing, making part of this specification.

I propose to capacitate a self acting weighing apparatus for easy removal from one place to another by a construction which adapts to each other the box or other receptacle with the steelyard, and the running gear which is rendered necessary.

Figure 1:
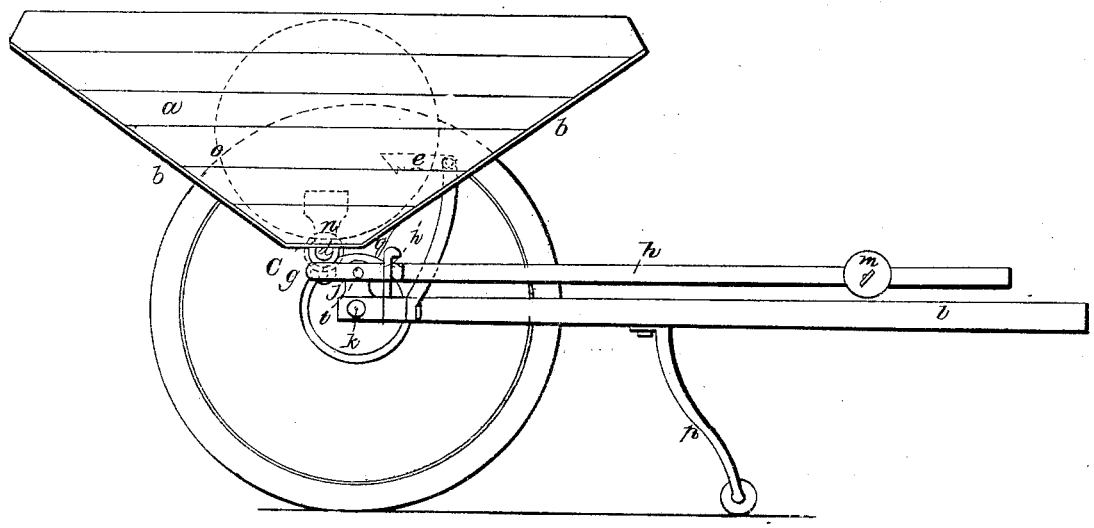
Figure 2:
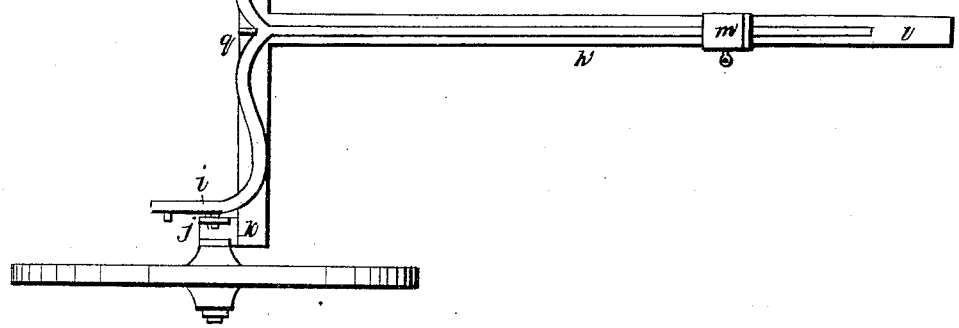

In the annexed drawings Figure 1, is a longitudinal section. Fig. 2 is a horizontal view of the running gear.

The same letters refer to like parts throughout.

(*a*) is a box or receptacle suitable for grain or other matters, having sloping sides (*b*) the interval between whose lower edges is closed by a valve (*c*) which, when the load has to be discharged can be rotated a quarter of a revolution upon its pivots (*d*); or, if the contents are of such a nature as to require it, the latch (*e*) being lifted, the body can be tilted over bodily on its pivots (*f*) projecting from the same cheeks (*g*) which afford journal bearings for the pivots (*d*). By the pivots (*f*) the entire box is supported within suitable bearings in the cross-head (*h'*) of the lever (*h*) whose gudgeons (*i*) rest in lugs (*j*) rising from the axle-tree (*k*).

(*l*) is an ordinary pole or tongue for the attachment of the draft.

(*m*) is a weight which rests upon the tongue and which by sliding along the lever determines the weight of the contents, or being set to a particular figure, indicates by the tilting of the lever when the car has received its proper charge or load. The position of the lever immediately over and upon the tongue permits the latter to be made available as a support, and at the same time places the lever conveniently out of the way of obstructing or interfering objects.

The bags or other packages may be placed immediately under the discharging bottom and in order to facilitate the free escape of the contents, the axle has a bent form as represented which places it out of the way of the falling matters.

A pinion shown by dotted lines (*n*) meshing into a spur wheel (*o*) may by the means of any of the known indicating devices afford by a half revolution of the valve an index of the number of loads.

(*p*) is a prop which supports the tongue in a horizontal position.

(*q*) is a stop which limits the upward motion of the lever.

Having thus fully, clearly and exactly described the nature, construction and operation of my improved weighing car, what I claim therein as new and desire to secure by Letters Patent is—

The construction and arrangement substantially as described by which a weighing apparatus is capacitated for easy removal from place to place by the adaptation to each other of the containing and weighing apparatus and of the running gear, that is to say by making the fulcra (*i*) for the lever or weighing beam (*h, h'*) upon the axle near the wheel; the arm with its sliding weight lying upon the pole or tongue (*l*), and the axle affording by its bent form free egress to the contents of the box when discharged by means of the valve.

In testimony whereof, I have hereunto set my hand before two subscribing witnesses.

N. B. LIVINGSTON.

Witnesses:
EDWARD H. KNIGHT,
GEO. H. KNIGHT.